July 22, 1958 — A. G. GURRIES — 2,844,353
SEAL FOR PLUG VALVES
Filed Feb. 28, 1955

INVENTOR
Albert G. Gurries
BY
ATTORNEYS

United States Patent Office 2,844,353
Patented July 22, 1958

2,844,353
SEAL FOR PLUG VALVES
Albert G. Gurries, Redwood City, Calif.
Application February 28, 1955, Serial No. 491,157
2 Claims. (Cl. 251—175)

This invention relates to plug valves, and particularly to pressure-actuated sealing means to prevent leakage of pressure between the pressure intake port of the valve body, and the valve plug, when the valve is closed. The specific sealing means of the present invention particularly represents an improvement over the sealing means of the same general nature shown in the copending application of Messrs. Gurries, Curlett, and Patterson, Serial No. 454,356, filed September 7, 1954, now abandoned.

The major object of this invention is to provide a seal for pressure engagement with the wall of the bore of the body about the pressure intake port thereof, which seal is seated in a socket formed in the plug, and is so constructed that the pressure within the port and acting on the seal is effective to force the outer edge of the seal against the bore about the port, regardless of any looseness or lack of contacting fit which may exist between the seal and the socket. It is therefore unnecessary that the wall of the socket be accurately machined so as to have a precision fit with the seal.

Another object of the invention is to construct the seal so that the incoming pressure in the valve will act on the bottom or inner end of the seal to effect an enlargement in diameter of the seal at its base or inner end, so as to cause the sidewall of the seal at said end to bear firmly against the wall of the socket without any stretching of the bottom of the seal being had. Also, the seal is formed in the manner of a suction cup so that the pressure will initially act to cause the seal to firmly seat in the socket, in order to prevent possible rotation of the seal therein, and to so remain even if the pressure should subsequently fail.

The seal is inherently very flexible, to enable it to readily respond to pressure exerted against the same, and a further object of the invention is to reinforce and stiffen the seal so that it will not tend to be distorted by pressure acting on one edge of the seal when the valve is in a cracked or slightly open position, without affecting the desired flexibility of the seal needed to attain a proper fluid-tight fit when pressure acts on the same.

Still another object of the invention is to provide a seal for plug valves which is designed for ease and economy of manufacture.

It is also an object of the invention to provide a practical and reliable seal for plug valves, and one which will be exceedingly effective for the purpose for which it is designed.

These objects are accomplished by means of such structure and relative arrangement of parts as will fully appear by a perusal of the following specification and claims.

Figure 1:
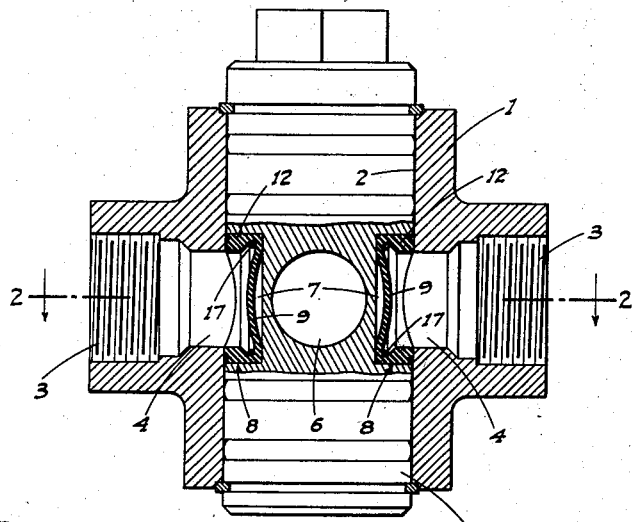
Fig. 1 is a sectional elevation of a plug valve and body unit showing the improved seals as mounted in the plug; the latter being closed.
Figure 3:
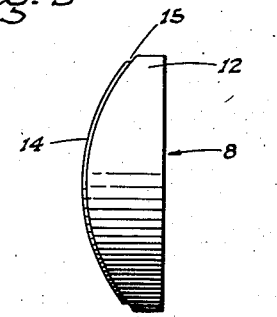
Fig. 3 is an enlarged elevation of one of the seals, detached.

Referring now more particularly to the drawings, and to the characters of reference marked thereon, the valve unit comprises a body 1 having a cylindrical bore 2 therethrough.

Diametrally opposed passages 3, tapped for connection to pressure supply and outlet pipes, terminate in ports 4 in communication with the bore 2 intermediate the ends thereof.

A plug 5 is turnably mounted in the body and is formed with a diametral passage 6 positioned to register with ports 4 in one position of the plug, or to move out of such register when the plug is turned the requisite amount.

Formed in the plug at right angles to the passage 6 and at the same level as the ports 4, are circular cup-like sockets 7, somewhat larger in diameter than said ports. These sockets removably support the seals which are the subject matter of this invention, and which are of flexible material, such as "neoprene" or the like. Each seal comprises a cup-like member, indicated generally at 8, and which includes a bottom wall 9 which is flat adjacent its periphery, as at 10, to rest flatly on the corresponding bottom surface of the cup, but is concaved inwardly of—and relative to—flat portion 10, as at 11, so that the opposite outer face of the concave portion is convex relative to the outer end of the seal.

The circular sidewall 12 of the seal is of a size on the outside to fit the sidewall of socket 7, and its outer end is contoured to follow the curvature of the plug 5, and of course the cooperating bore 2; the axial extent of the sidewall 12 as a whole being slightly greater than the depth of the socket 7, so that when the seal is properly inserted in said socket, the outer edge of the seal will engage the body bore 2 about the port 4 with a certain pressure.

Figure 4:
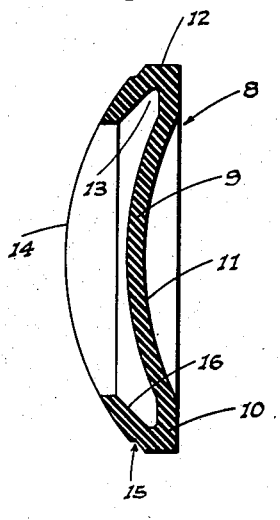
Fig. 4 is an enlarged diametral section of a seal as in Fig. 2, detached.
Figure 2:
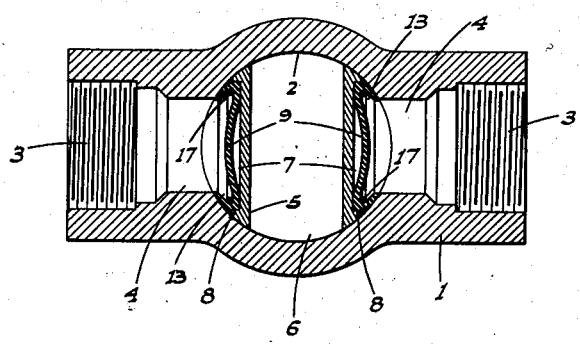
Fig. 2 is a cross section on line 2—2 of Fig. 1.

The thickness of the sidewall 12 is such that the diameter of the inner periphery thereof is the same as that of port 4, as shown in Figs. 1 and 2, and said wall on the inside is formed with a deep groove 13 of V-form, and one face of which is parallel to the flat bottom surface 10 and spaced therefrom a distance substantially equal to the thickness of the bottom portion 9, as most clearly shown in Fig. 4.

The peripheral bore-engaging surface 14 of the sidewall 12 of the seal is recessed at its junction with the cylindrical face of the sidewall, as shown at 15, so as to maintain a predetermined pressure ratio—preferably 1 to 1—between said surface 14 and the adjacent sidewall 16 of the groove 13.

The above described seals are of course effective when the valve is closed, as shown in Figs. 1 and 2. Pressure in one port 4 presses outwardly, or radially out, relative to the plug, against the exposed wall 16 of groove 13, and also against the convex bottom portion 11 of the seal. As a result, the entire peripheral surface of the bore engaging edge 14 of the seal is forced with the same pressure throughout its extent against the wall of the bore 2 about the port 4; effectively sealing the bore—and plug—against escape of pressure therebetween at said port 4, irrespective of whether or not the seal cup has a close fit in its socket in the plug either radially of the plug or of the cup. An upstream check against the leakage of pressure about or lengthwise of the plug from the intake or pressure port of the valve body is therefore provided. The grooved construction of the valve permits the plug to rotate without pinching-off or cutting the seal on the edge of the port, while at the same time providing for an effective seal about the port when the valve is closed, as previously set forth.

At the same time, the pressure within the cup presses against the convex bottom portion 11, and since there is no resisting pressure in the space between said portion 11 and the bottom of the socket, said portion 11 is flattened out against the bottom of the socket. This action effects an enlargement in diameter of the bottom of the cup and of the adjacent portion of the sidewall 12 of the seal cup; pressing said sidewall into firm holding and sealing relation with the sidewall of the socket. Also, the concaved portion 11 tends to act as a suction cup with the bottom of the socket, so as to retain the cup against movement relative to the socket.

The seal is of very flexible material so that it is readily acted on even by relatively low pressures. In order to prevent possible distortion and dislodgment of the seal by the pressure when the plug is slightly opened or cracked, a relatively stiff resilient split spring ring 17 may be disposed in the seal cup at the bottom or apex of the groove 13, as shown in Figs. 1 and 2. Such a ring stiffens the seal cup without interfering with the expanding of the same by pressure therein, as above described.

While the body—and plug—may be made of metal, as is customary, it is contemplated that for relatively low pressure, the above parts shall be made of a suitable form of plastic, since with the novel sealing means now provided it is not necessary to accurately machine such parts, and certain plastics would be especially suitable for use in conduit systems through which various chemical substances flow and which would combine with or corrode metal valves.

It is to be noted, as the description of operation of the seal shows, that the seal is particularly of value on the pressure side of the valve, and in many cases the valves will be equipped with only one such seal. However, in the present instance I have shown the valve as being equipped with identical seals on both the pressure and outlet sides of the valve, since the valve is of a reversible type, and may thus be installed in a pipe line with either side of the valve being the pressure side.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the invention, as defined by the appended claims.

Having thus described the invention, the following is claimed as new and useful, and upon which Letters Patent are desired:

1. A seal for a plug valve, said valve including a body having a bore, and a plug turnable in the bore, the plug having a passage therethrough and the body having ports communicating with the bore in position to register with the plug passage, and one of which ports is arranged for connection to a source of pressure; the plug being formed with a cup-like socket in position to aline with said one port when the valve is closed and larger than said port, and a flexible seal-forming cup disposed in fitting relation in the socket and arranged at its outer end to pressingly engage the wall of the bore about the port, said cup including an integral solid bottom member, said bottom member being flexible and the central portion thereof being concave relative to the bottom of the socket and initially spaced therefrom.

2. A seal, as in claim 1, in which the opposite faces of said member are substantially parallel to each other.

References Cited in the file of this patent

UNITED STATES PATENTS

| 1,872,417 | Dalldorf | Aug. 16, 1932 |
| 1,947,071 | Walton | Feb. 13, 1934 |
| 2,366,520 | Griffith | Jan. 2, 1945 |
| 2,505,270 | Allen | Apr. 25, 1950 |

FOREIGN PATENTS

| 11,694 | Great Britain | June 15, 1895 |
| 507,140 | Belgium | Nov. 30, 1951 |